United States Patent [19]

Kinoshita

[11] Patent Number: 4,458,326
[45] Date of Patent: Jul. 3, 1984

[54] METHOD AND APPARATUS FOR CIRCULAR INTERPOLATION

[75] Inventor: Mitsuo Kinoshita, Hachioji, Japan
[73] Assignee: Fujitsu Fanuc Limited, Tokyo, Japan
[21] Appl. No.: 294,248
[22] Filed: Aug. 19, 1981
[30] Foreign Application Priority Data Sep. 8, 1980 [JP] Japan ............................. 55-124164

[51] Int. Cl.³ ........................................ G05B 19/415
[52] U.S. Cl. ................................... 364/723; 318/573
[58] Field of Search .................. 364/723, 164; 318/573

[56] References Cited

U.S. PATENT DOCUMENTS

| | | | |
|---|---|---|---|
| 3,109,092 | 10/1963 | Lott et al. | 364/723 |
| 3,703,327 | 11/1972 | Pomella et al. | 318/571 |
| 3,864,613 | 2/1975 | Cutler | 318/573 |
| 4,031,369 | 6/1977 | Heaman et al. | 364/723 X |
| 4,150,328 | 4/1979 | Cannon | 318/573 |
| 4,243,924 | 1/1981 | Onoda et al. | 318/573 |

OTHER PUBLICATIONS

Schmid, "Interpolation in Numerical Path Controls", *Steverungstechnik*, vol. 2, No. 9, Sep. 1969, pp. 342–349.
Bergren, "A Simple Algorithm for Circular Interpolation", *Control Engineering*, Sep. 1971, pp. 57–59.

Primary Examiner—David H. Malzahn
Attorney, Agent, or Firm—Staas & Halsey

[57] ABSTRACT

A method and apparatus for circular interpolation on the basis of a given arc center O, arc starting point $P_s$ and arc end point $P_e$. In a case where the given arc end point $P_e$ does not lie on an arc of center O passing through the given arc starting point $P_s$, a new center $O_N$ of an arc passing through the points $P_s$, $P_e$ is computed, and circular interpolation is performed on the basis of the computed center $O_N$, the given starting point $P_s$ and the given end point $P_e$.

6 Claims, 5 Drawing Figures

METHOD AND APPARATUS FOR CIRCULAR INTERPOLATION

BACKGROUND OF THE INVENTION

This invention relates to a method and apparatus for circular interpolation and, more particularly, to a method and apparatus for circular interpolation in a numerical control system wherein circular interpolation is performed by giving the center of an arc as well as the starting and end points of the arc.

A numerical control system generally is equipped with a circular interpolation function. Such a system is disclosed in the FANUC 200C Operator's Manual, pp. 61–64 (published by Fujitsu Fanuc, December, 1979). In order to move a tool or table along an arc, the numerical control system executes a circular interpolation operation on the basis of information such as the center, starting and end points of the arc, and distributed pulses $X_p$, $Y_p$ indicative of movement along the X-axis and Y-axis are generated as a result of the interpolation operation. The distributed pulses $X_p$, $Y_p$ are applied to servo circuits which respond by driving X- and Y-axis motors to transport the tool along the instructed arc so that the tool may machine the desired arc into a workpiece.

In the conventional numerical control system that employs the aforementioned circular interpolation method, a disadvantage arises when the distances $r_A$, $r_B$ from the center to the starting and end points of the arc, respectively, are different, the center, starting and end points of the arc being specified by the program. When such is the case, as shown in FIG. 1, the tool is so controlled as to move from the starting point $P_s$ to the point $P_e'$ along the arc CA' of radius $r_A$ and center 0, and then from the point $P_e'$ to the end point $P_e$. This lowers cutting precision and is undesirable in cases where high precision is required, as in machining with a wire-type electric discharge machine. Further, with such a machine so-called "back-up" control may be applied to move the wire electrode backwardly along the previously cut path when the wire comes into contact with the workpiece, but back-up control is difficult to carry out when the wire moves in the manner described above. It should be noted that a situation in which $r_A$ and $r_B$ are unequal may arise as the result of a calculation error or the like during programming.

Thus there is a need for a numerical control system that is capable of moving a tool along a curve which smoothly connects the starting point $P_s$ and end point $P_e$ of an arc even when $r_A$ and $r_B$ in the given arc interpolation instruction are unequal.

SUMMARY OF THE INVENTION

Accordingly, an object of the present invention is to provide a method of circular interpolation capable of moving a tool along a curve which smoothly interconnects the starting point $P_s$ and end point $P_e$ of an arc even when the distances $r_A$, $r_B$ from the center 0 to the starting and end points $P_s$, $P_e$ of the arc, respectively, are unequal, the points 0, $P_s$ and $P_e$ being given by the program.

Another object of the present invention is to provide a method capable of readily furnishing an arcuate curve which smoothly connects the starting and end points $P_s$, $P_e$ of an arc even when the distances $r_A$, $r_B$ are unequal.

Still another object of the present invention is to provide a circular interpolation apparatus in a numerical control system, which apparatus is capable of moving a tool along a curve which smoothly connects the starting and end points $P_s$, $P_e$ of an arc even when the distances $r_A$, $r_B$ are unequal.

A further object of the present invention is to provide a circular interpolation apparatus in a numerical control system, which apparatus is capable of effecting highly precise machining by moving a tool along an arc which connects the starting and end points $P_s$, $P_e$ of an arc even when the distances $r_A$, $r_B$ are unequal.

Other features and advantages of the invention will be apparent from the following description taken in connection with the accompanying drawings.

DESCRIPTION OF THE PREFERRED EMBODIMENT

Figure 2:
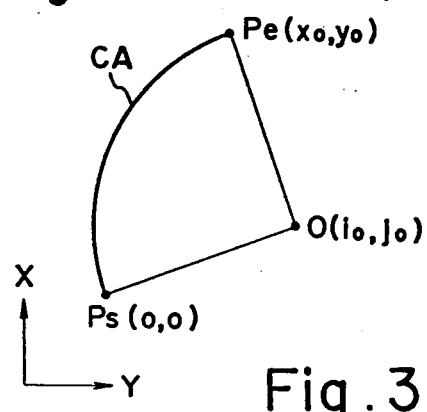
FIG. 2 is an illustrative view useful in describing a method of circular interpolation according to the prior art.

In FIG. 2, if we let $(i_o, j_o)$ denote the coordinates of the center 0 of an arc for a case where the current position (arc starting point) $P_s$ of a tool is taken as the standard, and let $(x_o, y_o)$ denote the coordinates of the end point $P_e$ of the arc, then a circular interpolation instruction will be given by:

$$G02Xx_oYy_oIi_oJj_o \qquad (1)$$

where G02 represents a G function (preparatory function) instruction indicative of circular interpolation in the clockwise direction, and * represents the end of the block comprising $Xx_o$, $Xy_o$, $Jj_o$. The circular interpolation apparatus, upon receiving the circular interpolation instruction of expression (1), executes a known circular interpolation operation to generate circular interpolation pulses on the basis of which a tool is moved along the arc CA.

Figure 3:
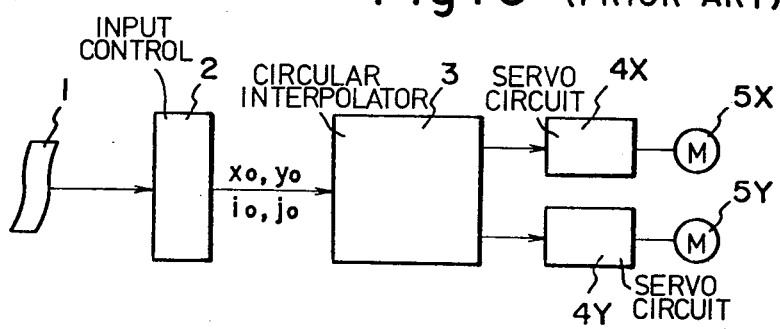
FIG. 3 is a block diagram of a numerical control system which employs a circular interpolation apparatus according to the prior art.

The numerical control system shown in FIG. 3 includes a paper tape 1 bearing punched machining instructions, an input control circuit 2, a circular interpolator 3 which operates on the basis of an algebraic method, as disclosed in "Introduction to Numerical Control Devices" by Seiuemon Inaba, 1970, pp. 21–35, or on the basis of a DDA (digital differential analyzing) method, well-known X-axis and Y-axis servo circuits 4X, 4Y, respectively, and X-axis and Y-axis servo motors 5X, 5Y, respectively.

Figure 1:
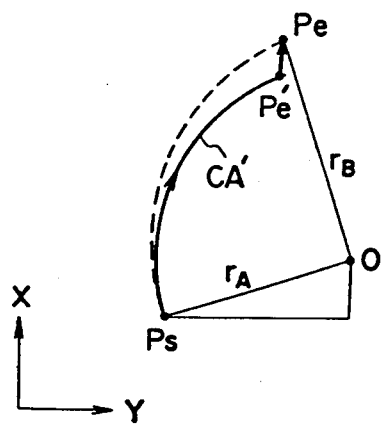
FIG. 1 is an illustrative view useful in describing the path traversed by a tool in the prior art when the distances $r_A$, $r_B$ are unequal.

In operation, the input control circuit 2 applies the arc information $x_o$, $y_o$, $i_o$, $j_o$ to the circular interpolator 3 when the circular interpolation instruction is read from the paper tape 1. The interpolator 3 executes a circular interpolation operation on the basis of the arc information and delivers the interpolation pulses $X_p$, $Y_p$ to the respective servo circuits 4X, 4Y which in turn drive the servo motors 5X, 5Y. When the servo motors rotate, a movable object such as the tool (not shown) is moved as instructed from the starting point $P_s$ to the end point $P_e$ along the arc CA shown in FIG. 2. In accordance with this method, however, a problem is encountered when the distance $r_A$ from the programmed center 0 to the programmed starting point $P_s$ is not equal to the distance $r_B$ from the programmed center 0 to the programmed end point $P_e$. Specifically, when $r_A$ not equal to $r_B$, as shown in FIG. 1, the tool is so controlled as to move from the starting point $P_s$ to the point $P_e'$ along the arc CA' of radius $r_A$ and center 0, and then from the point $P_e'$ to the end point $P_e$. This lowers cutting precision.

Figure 4:
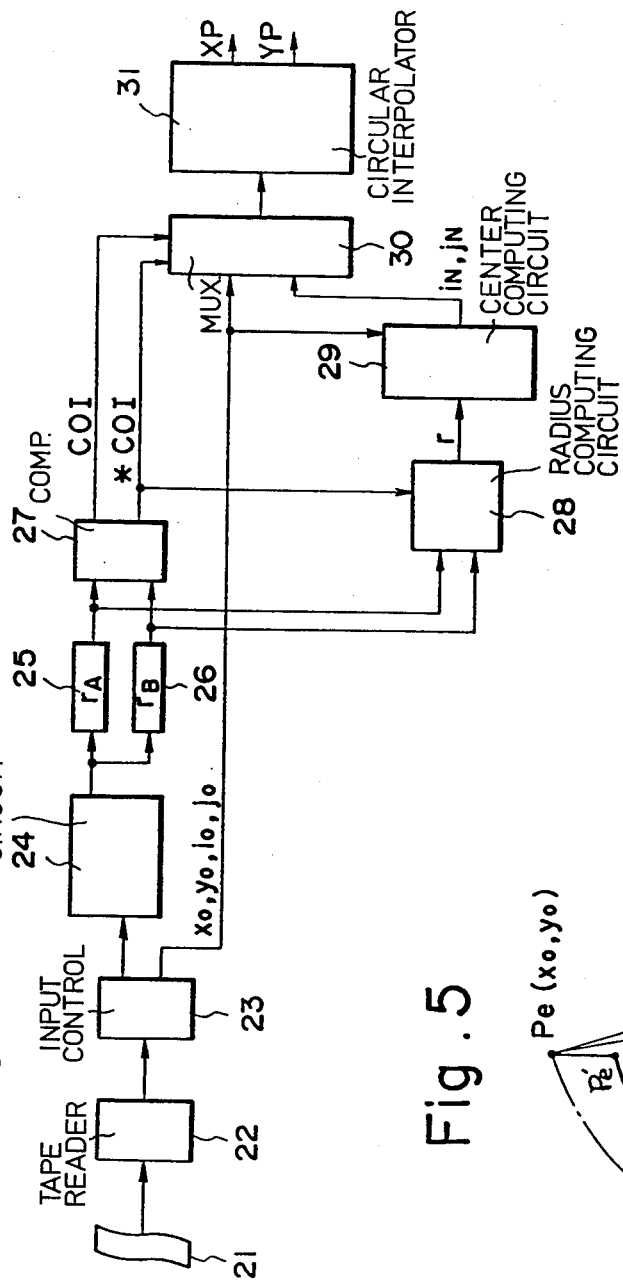
FIG. 4 is a block diagram of a circular interpolation apparatus for practicing the present invention.
Figure 5:
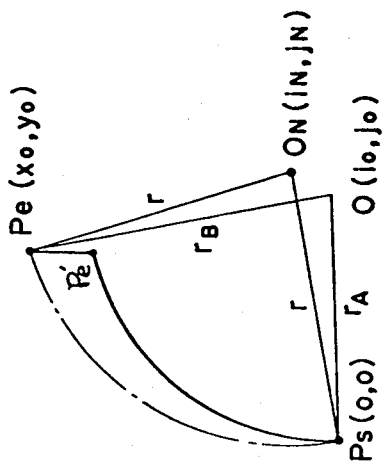
FIG. 5 is an illustrative view useful for describing a method of circular interpolation according to the present invention.

FIG. 4 illustrates the block diagram of an apparatus for practicing a circular interpolation method in accordance with the present invention, and FIG. 5 is an illustrative view useful in describing said method.

In FIG. 4 there are provided a paper tape 21 bearing the punched machining instructions, a tape reader 22, and an input control circuit 23 which includes decoders, registers and the like. When the circular interpolation instruction given by expression (1) is read from the paper tape 21, a radius arithmetic circuit 24 computes the distances $\overline{OP_s}$ (namely $r_A$) and $\overline{OP_e}$ (namely $r_B$) by executing the operations:

$$r_A = \sqrt{i_o^2 + j_o^2} \qquad (2)$$

$$r_B = \sqrt{(x_o - i_o)^2 + (y_o - j_o)^2} \qquad (3)$$

Registers 25, 26 store the respective radii $r_A$, $r_B$ computed by the arithmetic circuit 24. A comparator circuit 27 compares $r_A$ and $r_B$ and issues a coincidence signal COI (logical "1") when they are equal, and a non-coincidence signal *COI (logical "1") when they are unequal. Numeral 28 denotes an arithmetic circuit for computing a new radius. Specifically, when the signal *COI is a "1", the arithmetic circuit 28 executes the operation:

$$r = (r_A + r_B)/2 \qquad (4)$$

to compute a new radius r. Numeral 29 denotes an arithmetic circuit for computing a new center $O_N(i_N, j_N)$ by executing the operations:

$$i_N^2 + j_N^2 = r^2 \qquad (5)$$

$$(i_N - x_o)^2 + (j_N - y_o)^2 = r^2 \qquad (6)$$

A multiplexer 30 outputs $x_o$, $y_o$, $i_N$, $j_N$ when the signal *COI is a "1" The output of the multiplexer 30 is coupled to a circular interpolator 31.

The present invention operates in the following manner.

When the paper tape 21 instructs the circular interpolation indicated by expression (1), the input control circuit 23 stores the data $x_o$, $y_o$, $i_o$, $j_o$ in the internal registers and simultaneously delivers the data to the radius arithmetic circuit 24. The latter executes the operations specified by equations (2) and (3) to compute the radii $r_A$, $r_B$ which are stored in the registers 25, 26, respectively. When $r_A$ and $r_B$ have been computed, the comparator circuit 27 compares the radii and delivers the coincidence signal COI (logical "1") when they are equal, and delivers the non-coincidence signal *COI (logical "1") when they are unequal. When the signal COI is a "1", the multiplexer 30 delivers the data $x_o$, $y_o$, $i_o$, $j_o$ to the circular interpolator 31 which executes a known circular interpolation operation in the same manner as the conventional arrangement, thereby delivering interpolation pulses $X_p$, $Y_p$ to servo circuits which are not shown, the latter responding by rotatively driving the servo motors.

When the non-coincidence signal *COI goes to logical "1" in a case where $r_A$ and $r_B$ are unequal, the new radius arithmetic circuit 28 executes the operation indicated by equation (4) to compute the new radius r. It may be appreciated from equation (4) that the new radius r is the arithmetic mean of the radii $r_A$, $r_B$.

Next, the new center arithmetic circuit 29 computes the coordinates $(i_N, j_N)$ of the new center $O_N$ using the equations (5) and (6). Since the signal *COI is a "1", coordinates $i_N$, $j_N$ are sent to the circular interpolator 31 together with $x_o$ and $y_o$ via the multiplexer 30. The circular interpolator 31 executes a circular interpolation operation on the basis of $x_o$, $y_o$, $i_N$ and $j_N$, delivering the interpolation pulses $X_p$, $Y_p$ to the servo circuits (not shown) to drive the servo motors. As a result, a tool (not shown) is moved from the arc starting point $0_s$ to the arc end point $P_e$ along the arc of center $0_N$ as indicated by the dot-and-dash line in FIG. 5, whereby the tool machines a workpiece smoothly between the points $P_s$ and $P_e$.

In accordance with the present invention as described above, a movable object such as a tool or table can be moved along a curve or arc which smoothly connects a given starting point $P_s$ and a given end point $P_e$ even for a given arc instruction in which $r_A$ and $r_B$ are unequal. This makes it possible to achieve a higher level of machining precision, and facilitates the wire electrode backup control operation in a wire cut-type electric discharge machine.

Although the present invention has been described in relation to the embodiment shown in the accompanying drawings, various changes and modifications may be made in the invention without departing from the spirit and scope thereof as set forth in the appended claims. For example, rather than providing the individual hardware for the radius arithmetic circuit, new radius arithmetic circuit, new center arithmetic circuit and comparator circuit as described above, these functions may be integrated by using a microcomputer or the like. Moreover, the new radius, although found from equation (4) above, need not necessarily be computed using said equation.

What we claim is:

1. A method of automatically correcting the circular path of a numerically controlled machine tool in which a circulator interpolation operation is performed in accordance with a given arc center 0, machine tool arc starting point $P_s$ and machine tool arc end point $P_e$, comprising the steps of:
   a. computing a distance $r_A$ from the given arc center 0 to the given machine tool arc starting point $P_s$, and a distance $r_B$ from the given arc center 0 to the given machine tool arc end point $P_e$;
   b. determining whether the distances $r_A$ and $r_B$ are equal;
   c. computing a new arc center $0_N$ of an arc passing through said starting point $P_s$ and said end point $P_e$ when the distance $r_A$ and the distance $r_B$ are unequal; and
   d. executing a circular interpolation operation on the basis of the computed arc center $0_N$, the given machine tool arc starting point $P_s$ and the given machine tool arc end point $P_e$ wherein the circular path of the machine tool is corrected and joins the machine starting point $P_s$ and the machine tool ending point $P_e$.

2. A method of automatically correcting the circular path of a numerically controlled machine tool according to claim 1, including the step of executing a circular interpolation operation on the basis of the given arc center 0, the given machine tool arc starting point $P_s$ and the given machine tool arc end point $P_e$ when the distance $r_A$ and the distance $r_B$ are equal.

3. A method of automatically correcting the circular path of a numerically controlled machine tool according to claim 1 or claim 2, wherein step c includes:
   i. computing $(r_A+r_B)/2$
   ii. determining the circle passing through the given machine tool arc starting point $P_s$ and the given machine tool arc end point $P_e$ with radius $(r_a+r_B)/2$, the center of the circle serving as the new center $0_N$.

4. An apparatus for automatically correcting the circular path of a numerically controlled machine tool and performing a circular interpolation operation in accordance with a given arc center 0, machine tool arc starting point $P_s$ and machine tool arc end point $P_e$, comprising:
   first means for receiving said given arc center 0, said machine tool arc starting point $P_s$ and said machine tool arc end point $P_e$;
   a first arithmetic unit operatively connected to said first means, for computing a distance $r_A$ from the given arc center 0 to the given machine tool arc end point $P_s$, and a distance $r_B$ from the given arc center 0 to the given machine tool arc end point $P_e$;
   a comparator unit operatively connected to said first arithmetic unit, for determining whether the distances $r_A$ and $r_B$ are equal;
   a second arithmetic unit operatively connected to said first arithmetic unit, to said first means and to said comparator unit for computing a new arc center $0_N$ of an arc passing through said machine tool arc starting point $P_s$ and said machine tool arc end point $P_e$ in response to the distance $r_A$ and the distance $r_B$ being unequal; and
   a circular interpolation unit operatively connected to said comparator unit, to said first means and to said second arithmetic unit, for executing a circular interpolation operation in accordance with the computed arc center $0_N$, the given machine tool arc starting point $P_S$ and the given machine tool arc end point $P_e$ and for controlling the numerically controlled machine tool.

5. An apparatus according to claim 4, where the second arithmetic unit includes:
   a radius arithmetic circuit for computing the coordinates $(i_N, j_N)$ of a new arc center from the equations:

$$i_N^2+j_N^2=r^2$$

$$(i_N-x_o)^2+(j_N-y_o)^2=r^2$$

where the given center coordinates are $(i_o, j_o)$, the given machine tool arc starting point coordinates are $(x_o, y_o)$, and the new arc center coordinates are $(i_N, j_N)$.

6. An apparatus according to claim 4 or 5, wherein said circular interpolation unit executes a circular interpolation operation selectively in accordance with one of the given arc center 0, the given machine tool arc starting point $P_s$, the given machine tool arc end point $P_e$; and a computed arc center $0_N$, the given machine tool arc starting point $P_s$, the given machine tool arc end point $P_e$ in response to the distances $r_A$ and $r_B$ being equal or unequal, respectively.

* * * * *

UNITED STATES PATENT AND TRADEMARK OFFICE
CERTIFICATE OF CORRECTION

PATENT NO. : 4,458,326

DATED : July 3, 1984

INVENTOR(S) : KINOSHITA

It is certified that error appears in the above-identified patent and that said Letters Patent is hereby corrected as shown below:

Column 2, line 41, "$G02Xx_0Yy_0Ii_0Jj_0$" should be

--$G02\ Xx_0\ Yy_0\ Ii_0\ Jj_0{}^*$--.

*Signed and Sealed this*

*First* Day of *October 1985*

[SEAL]

Attest:

DONALD J. QUIGG

*Attesting Officer*

*Commissioner of Patents and Trademarks—Designate*